(12) United States Patent
Miyagawa et al.

(10) Patent No.: US 6,676,297 B1
(45) Date of Patent: Jan. 13, 2004

(54) ROLLING BEARING

(75) Inventors: Takayuki Miyagawa, Fujisawa (JP); Banda Noda, Fujisawa (JP); Yasuyuki Muto, Fujisawa (JP); Tatsunobu Momono, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/674,850

(22) PCT Filed: Jul. 7, 2000

(86) PCT No.: PCT/JP00/04539
§ 371 (c)(1), (2), (4) Date: Feb. 22, 2001

(87) PCT Pub. No.: WO01/04504
PCT Pub. Date: Jan. 18, 2001

(30) Foreign Application Priority Data

Jul. 9, 1999 (JP) .......... H11-196169
Jul. 4, 2000 (JP) .......... 2000-201821

(51) Int. Cl.$^7$ .......... F16C 19/06
(52) U.S. Cl. .......... 384/450; 384/513; 384/516; 384/523
(58) Field of Search .......... 384/513, 450, 384/515, 516, 569, 523

(56) References Cited

U.S. PATENT DOCUMENTS 5,228,786 A * 7/1993 Tanimoto et al. .......... 384/513

FOREIGN PATENT DOCUMENTS

JP 6058849 3/1994
JP 11196548 7/1999

* cited by examiner

Primary Examiner—Lenard A. Footland
(74) Attorney, Agent, or Firm—Crowell & Moring LLP

(57) ABSTRACT

The frequencies generated based on the undulations existing on the inner and outer ring raceways 8, 10 and on the rolling surface of the balls 11, 11 are out of coincidence with the rotational frequency itself of the rotation member supported by the rolling bearing, and with a frequency component which is a multiple of the rotational frequency, or kinds of frequencies generated due to the undulations are out of coincidence with each other in the natural frequency domain of a rotation system which is a rotation supporting portion having the rolling bearing incorporated therein, whereby without using a special grease, the self-excited frequency of the rolling bodies hardly grows to abnormal vibration, and a rolling bearing having sufficient durability and causing no abnormal vibration and noise even if used at low temperature is realized.

9 Claims, 4 Drawing Sheets

ABSTRACT

ROLLING BEARING

TECHNICAL FIELD

A rolling bearing according to this invention is incorporated into a rotation supporting section which is installed outdoors and may be driven at low temperatures, such as for example, a propeller shaft of a vehicle, or a rotation shaft of an electric motor, to thereby prevent the occurrence of harmful vibration or noise even at low temperatures.

BACKGROUND ART

In order to dampingly support for example, a middle portion of a propeller shaft of a vehicle under a floor of the vehicle, a rotation supporting unit 1 as shown in FIG. 1 is used. This rotation supporting unit 1 supports a rolling bearing 3 via a buffer material 4 and a housing 5, on the inner diameter side of a support bracket 2. Of these, the buffer material 4 is formed from a material having a large internal loss, such as rubber, so as to be freely displaceable in the radial direction (vertical direction in FIG. 1) and in thee axial direction (lateral direction in FIG. 1). The housing 5 is formed by fitting and combining elements 6a, 6b respectively formed in a cylindrical shape, for fittingly supporting an outer ring 7 of the rolling bearing 3 on the inside.

The rolling bearing 3, being a deep groove ball bearing, comprises an inner ring 9 having an inner ring raceway 8 on an outer peripheral surface thereof, an outer ring 7 having an outer ring raceway 10 on an inner peripheral surface thereof, and a plurality of rolling bodies (balls) 11, 11 arranged rollably between the inner ring raceway 8 and the outer ring raceway 10. The rolling bodies 11, 11 are rollably held by a retainer (not shown), respectively. Also, grease is filled into a space 12 existing between the outer peripheral surface of the inner ring 9 and the inner peripheral surface of the outer ring 7, in which the rolling bodies 11, 11 are arranged, and openings on the opposite ends of this space 12 are respectively sealed by ring-shaped seal rings 13, 13. Such a rolling bearing 3 constitutes the rotation supporting unit 1 described above, in such a manner that the outer ring 7 is supported under the floor of the vehicle via the housing 5 and the buffer material 4, and the inner ring 9 on the outside is fittingly secured to the middle portion of the propeller shaft 14.

The rotation supporting unit 1 for a propeller-shaft described above, or a rotation supporting apparatus incorporated in an electric motor installed outside, is used in a low temperature environment in the winter season. In the case of the rotation supporting unit 1 used under such a low temperature environment and lubricated by grease, when the temperature in the portion of the rolling bearing 3 is still low just after startup, abnormal vibration often occurs, and it is known that when the vibration is conspicuous, offensive noise to the ear occurs due to this abnormal vibration. In particular, it is known that under an environment of −10° C. or less, the offensive noise occurs conspicuously.

The mechanism in which such a noise occurs was elucidated in a paper "Research Regarding Abnormal Vibration of Ball Bearings" described in Nihon Machinery Society Paper, Vol. 63, No. 616 (Chapter C), pp 250~256, issued in December 1997. According to this paper, the above described mechanism is such that self-excited vibration of the rolling body becomes a cause of the above described abnormal vibration.

For example, if a rotation supporting unit 1 for supporting the middle portion of a propeller shaft 14 as shown in FIG. 1 is considered, when an axial force is applied to the rolling bearing 3 due for example to a change in the operating conditions, external disturbances, or friction in a joint portion disposed at the end of the propeller shaft, axial slippage occurs in each abutting portion between the rolling surface of the respective rolling bodies 11, 11 and the inner ring race 8 and the outer ring race 10. This generates a shear rate in the oil film of the grease intervening in each abutting portion. When this shear rate exceeds a certain value, the shear stress decreases, and the grease acts as a negative resistance. That is to say, there is a relationship expressed by an equation of equilibrium in the lubricant film: $dp/dx = d\tau/dy$, between the pressure p of the oil film in the grease and the shear stress $\tau$ of the oil film. As is obvious from this relation, as the shear stress $\tau$ of the oil film decreases, the pressure p of the oil film also decreases, to generate the self-excited vibration of the respective rolling bodies 11, 11 whose rolling surface abuts against the oil film. It is made clear in the paper "Simulation Regarding Nonlinear Vibration of Ball Bearings" described in Nihon Machinery Society Lecture Paper, No. 985-2, pp 269, issued in October 1998, that the frequency of such self-excited vibration becomes a multiple of the rotational frequency.

When the self-excited vibration occurs in the respective rolling bodies 11, 11 with the above described mechanism, the film thickness of the grease existing in the inner ring raceway 8, the outer ring raceway 10 and the rolling surface portion of the respective rolling bodies 11, 11 becomes uneven over the circumference, depending on the traveling tracks based on the rotation movement and revolution movement of the respective rolling bodies 11, 11. In other words, an undulation (bank of grease) is formed by the grease on the surface portion of the inner ring raceway 8 and the outer ring raceway 10 and on the rolling surface portion of the respective rolling bodies 11, 11, respectively. The banks of grease formed in this manner cause radial and axial vibrations, in the same manner as undulations originally existing on the inner ring raceway 8, the outer ring raceway 10 or the rolling surface of the respective rolling bodies 11, 11.

If the frequency of the self-excited vibration of the rolling bodies coincides with the vibration frequency resulting from the banks of grease, vibration is promoted. Moreover, if the frequency of the self-excited vibration of the rolling bodies and the vibration frequency resulting from the banks coincide with the vibration frequency resulting from undulations originally existing (not the banks of grease, but originally existing) on the inner ring raceway 8, the outer ring raceway 10 or the rolling surface of the respective rolling bodies 11, 11, vibration is further promoted to become large. Vibration which has grown in such a manner resonates with a member circumjacent to the rolling bearing 3, thereby resulting in offensive noise to the ear.

Abnormal vibration and noise described above occurs in the first place, based on the self-excited vibration of the rolling bodies and this self-excited vibration grows due to the banks of grease. Accordingly, in order to eliminate the above described banks of grease or to reduce the strength thereof so that the self-excited vibration does not grow to an abnormal vibration, grease having a low viscosity may be used. However, even with such a measure, it is difficult to obtain a sufficient effect at extremely low temperatures, as low as −10° C. Moreover, if grease having such a low viscosity that abnormal vibration does not occur even at such an extremely low temperature is used, the grease tends to leak through the above described respective seal rings 13, 13. Furthermore, grease having a low viscosity has a weak oil film holding power at the rolling contact portion, and in many cases, it is not always satisfactory from the standpoint of lubricating ability. As a result, when grease having a low viscosity is used, it becomes difficult to favorably maintain the lubricating condition of the rolling bearing 3 for a long period of time.

The present invention addresses the above situation, and realizes a rolling bearing which hinders growth of the self-excited vibration of the rolling bodies to an abnormal vibration, without using a special grease, and which has sufficient durability, and which does not generate abnormal vibration or noise, even if it is used at low temperatures.

DISCLOSURE OF THE INVENTION

All the rolling bearings of the present invention comprise a first race having a first raceway, a second race having a second raceway, and Z rolling bodies rollably disposed between the first raceway and the second raceway, as with the aforesaid conventional rolling bearing.

In particular, in the rolling bearing of the present invention, when assumed that n is a positive integer, the frequencies of the vibration generated due to the circumferential undulations of (nZ) waves and (nZ±1) waves existing on the surface of the first and second raceways, and the undulation of (2n) waves existing on the rolling surface of the respective rolling bodies, are controlled by the relation with the frequencies in other parts.

At first, in the case of the rolling bearing according to claim 1, the frequencies of the vibration generated due to the above described undulations does not coincide with either the rotational frequency itself of the rotation member supported by the rolling bearing, or a frequency component which is a multiple of the rotational frequency.

Also, in the case of the rolling bearing according to claim 2, a plurality of kinds of vibration frequencies generated due to the above described undulations do not coincide with each other, in the natural frequency domain of a rotation system which is a rotation supporting portion constituted by incorporating the rolling bearing.

In the case of the rolling bearing of the present invention constructed as described above, banks of grease are formed due to the self-excited vibration of the rolling bodies, but this vibration is not susceptible to growth even if vibration occurs due to the banks of grease. As a result, harmful abnormal vibration and offensive noise to the ear are unlikely to occur. The reason for this will be described below.

At first, a description is given of the reason why the vibration frequencies controlled by the relation with the frequencies in other parts, are limited to one due to the undulations of (nZ) waves and (nZ±1) waves existing on the raceway surface, and the undulation of (2n) waves existing on the rolling surface of the respective rolling bodies. Here, it is well known, as described for example in Japanese Unexamined Patent Publication No. Toku Kai Hei 8-247153 or the like, that the undulations existing on the raceway surface and the rolling surface exist in a plurality of kinds in number, even when seen on the same surface.

It is also well known, as described in Japanese Unexamined Patent Publication No. Toku Kai Hei 8-247153, that if it is assumed that the number of the rolling bodies is Z, and n is a positive integer, then with regard to the undulations existing on the surface of the first and second raceways, the circumferential undulations of (nZ) waves and (nZ±1) waves cause larger vibration compared to the undulations of other numbers of waves. Moreover, with regard to undulations existing on the rolling surface of the respective rolling bodies, the undulation of the (2n) waves cause large vibration. This is because since the undulation of the (2n) waves is formed such that peaks and valleys in the undulation exist in the diametrically opposite positions of the rolling surface, variations in the diameter of the rolling surface due to the rotation of the rolling bodies, in other words, variations in the gap between the first and second raceways described above, which put the rolling surface therebetween, increase. Therefore, the undulations regarding the controlled vibration frequency are respectively limited to the (nZ) waves and the (nZ±1) waves with regard to the raceway surface and the (2n) waves with regard to the rolling surface.

On the assumption described above, the reason why with the rolling bearing of the present invention, harmful abnormal vibration or offensive noise to the ear is unlikely to occur will be described. At first, the vibration frequencies due to the undulations of the number of waves which tend to result in large vibration as described above, do not coincide with either the rotational frequency itself of the rotation member supported by the rolling bearing, or the frequency components which are a multiple of the rotational frequency, including a case of substantially coinciding therewith (to the extent of resonating, for example approaching within an error of 1 to 2%). As a result, even if banks of grease are formed due to the self-excited vibration of the rolling body, and vibration occurs due to the banks, the vibration due to the banks is not promoted by vibration due to the undulations existing on the surface of the first and second raceways and on the rolling surface, and hence the vibration does not grow.

That is to say, when the rolling bearing is used in a state that, for example, the inner ring, being the first race, rotates at fr (Hz), self-excited vibration occurs in the rolling bodies at a frequency of $f\omega = n \cdot f_r$, and based on this self-excited vibration, banks of grease having a shape corresponding to the frequency of $f\omega = n \cdot fr$ are formed on the inner ring raceway, being the first raceway, and the outer ring raceway, being the second raceway, and the rolling surface portion of the respective rolling bodies. On the contrary, if the vibration frequencies due to undulations existing on the surfaces of the first and second raceways and undulations existing on the rolling surface, shown in Table 1, deviate from the above described frequency, $f\omega = n \cdot f_r$ (for example, by 1 to 2% or more, as described above), the undulations and the shape of the banks do not coincide with each other, thereby enabling prevention of growth of vibration due to the banks. Here, the degree of deviation in the frequencies so as not to cause resonance of the two vibrations more or less differs depending on various conditions such as the bearing size, but deviation of at least 1% is necessary. Moreover, if the deviation in the frequencies increases to 2% or more, resonance will not occur in almost all cases.

TABLE 1

|  | Radial Vibration | | Axial Vibration | |
| --- | --- | --- | --- | --- |
|  | No. of waves in undulation | Vibration frequency generated | No. of waves in undulation | Vibration frequency generated |
| Inner ring | nZ ± 1 | $nZf_i \pm f_r$ | nZ | $nZf_i$ |
| Outer ring | nZ ± 1 | $nZf_c$ | nZ | $nZf_c$ |
| Rolling body | 2n | $2nf_b \pm f_c$ | 2n | $2nf_b$ |

Wherein n: positive integer, Z: number of rolling bodies, $f_r$: rotational speed of the inner ring (Hz), $f_c$: rotational speed of a retainer {=revolving speed of the rolling bodies (Hz)}, $f_i = f_r - f_c$ (Hz), $f_b$: rotating frequency of the rolling bodies (Hz).

If the frequencies of the vibration due to undulations determined by the expression described in the above Table 1 are deviated from the frequency of $f\omega=n\cdot f_r$ described above, banks of grease formed corresponding to the frequency of $f\omega$ are crushed between each rolling surface and the surface of the first and second raceways and collapse, as the respective rolling bodies carry out the rotation movement and the revolution movement. That is to say, if the above described both frequencies coincide with each other, banks of grease once formed further grow due to the vibration based on the undulations, and the vibration itself also grows, thereby resulting in the above described abnormal vibration and noise. On the contrary, if the above described both frequencies do not coincide with each other, the track of the respective rolling bodies which generates vibration due to the undulations does not coincide with the shape of the banks of grease. Hence, the respective rolling bodies crush this bank, to thereby prevent the vibration generated due to the self-excited vibration of the rolling bodies from growing. Rather, the bank of grease collapses to thereby absorb the energy of vibration due to the undulations, and hence alleviate the vibration due to the undulations.

Moreover, even in the case where a plurality of kinds of vibration frequencies generated due to the undulations existing on the surfaces of the first and second raceways and the rolling surface of the respective rolling bodies are made so as not to coincide with each other, in the natural frequency domain of the rotation member supported by the rolling bearing, the growth of the vibration can be suppressed, to thereby prevent the occurrence of the above described abnormal vibration and noise. That is to say, vibrations of different frequencies generated due to the undulations on the above described surfaces do not promote the growth each other, and vibration of at least any of the frequencies makes the banks of grease collapse, to thereby prevent the occurrence of the above described abnormal vibration and noise.

Respective reference symbols denote the followings: 1: rotation supporting apparatus; 2: support bracket; 3: rolling bearing; 4: buffer material; 5: housing; 6a, 6b: elements; 7: outer ring; 8: inner ring raceway; 9: inner ring; 10: outer ring raceway; 11: rolling body (ball); 12: space; 13: seal ring; 14: propeller shaft; 15: acceleration sensor; 16: amplifier; 17: computer.

BEST MORE FOR CARRYING OUT THE INVENTION

Figure 1:
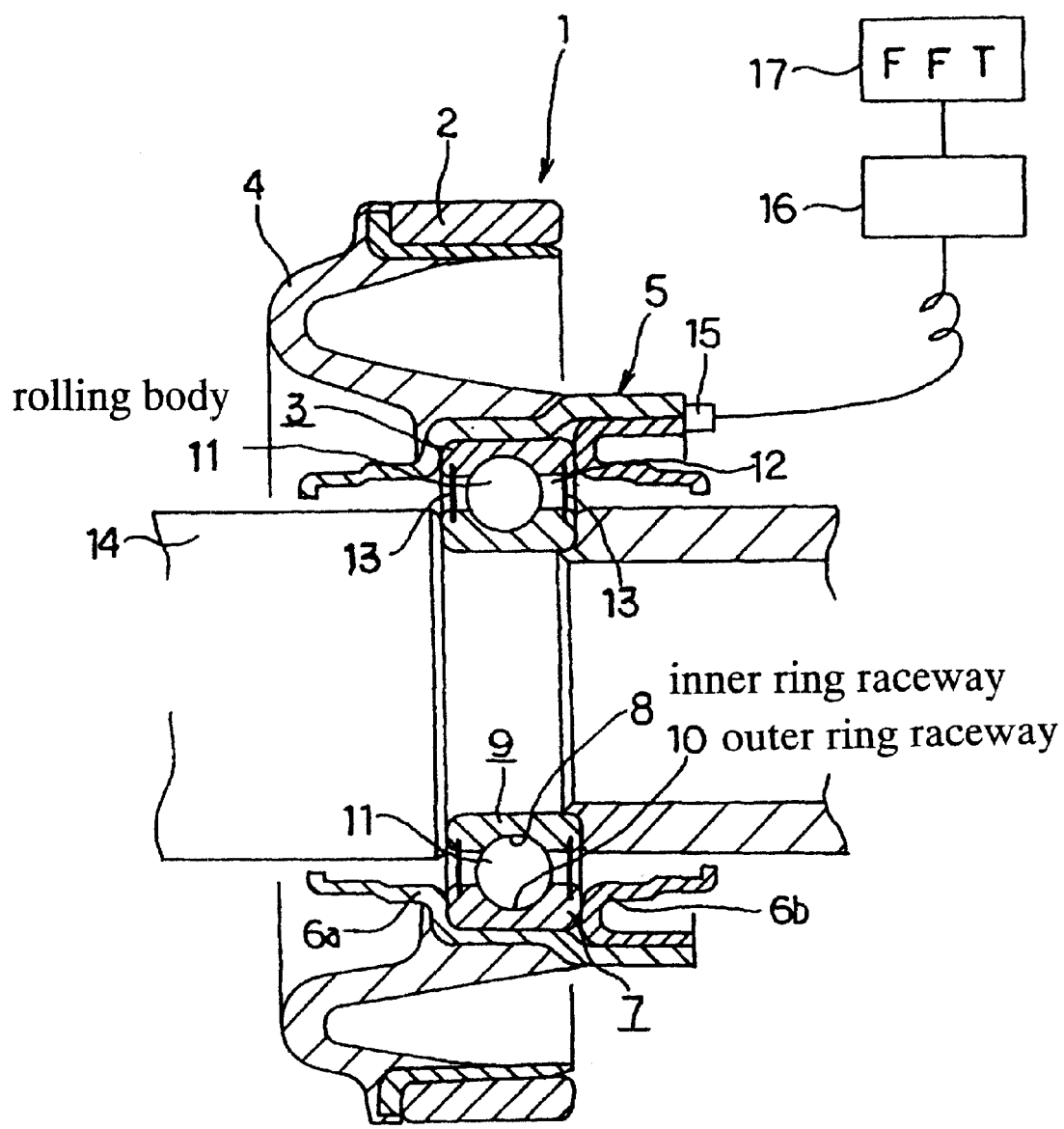
FIG. 1 is a cross sectional view showing one example of a rotation supporting portion incorporating a rolling bearing, being an object of the present invention.

In a procedure for designing a rolling bearing satisfying the requirement of the present invention, a description will be made of a case where a radial ball bearing in which the rolling bodies are balls, and where in use the outer ring, being the first race, is kept stationary and the inner ring, being the second race, is rotated, is used for supporting the rotation of a propeller shaft 14 as shown in FIG. 1.

The axial vibration frequency $nZf_c$ (Hz) of the outer ring, the axial vibration frequency $mZf_i$ (Hz) of the inner ring, and the axial vibration frequency $2kf_b$ (Hz) of the balls, resulting from the undulations of the bearing parts, which are nZ with regard to the inner ring and the outer ring, and 2n with regard to the rolling bodies described in the above Table 1, are respectively represented by the following Expressions (1) to (3):

$$Zf_c=(1/2)nf_r\{1-(D_a/d_m)\cos\alpha\}Z \qquad (1)$$

$$mZf_i=(1/2)mf_r(1+(D_a/d_m)\cos\alpha\}Z \qquad (2)$$

$$2kf_b=kf_r\{1-(D_a/d_m)^2\cos^2\alpha\}d_m/D_a \qquad (3)$$

Here, in these expressions (1) to (3), n, m and k are optional positive integers. In the above described Table 1, all are denoted by n. However, in order to distinguish the source of axial vibration generated in the radial ball bearing, consideration is given by dividing these into three kinds of positive integers. Moreover, $d_m$ (mm) denotes a diameter of a pitch circle of a plurality of balls constituting the radial ball bearing, and a denotes a contact angle between these balls and the respective races. Other symbols have the same meaning as described in the Table 1.

In order to realize a radial ball bearing corresponding to Claim 1, this is constructed such that the axial vibration frequency generated in each constituent part of the radial ball bearing, as shown by Expressions (1) to (3), does not coincide with the frequency $jf_r$ (j is an optional positive integer) proportional to the rotational frequency $f_r$ of the inner ring, being a rotation member, that is, $nZf_c \neq jf_r$, $mZf_i \neq jf_r$, $2kf_b \neq jf_r$ (first design condition). This first design condition corresponding to Claim 1 is a condition in which even if a bank of grease is formed due to resonance, this does not promote noise and vibration.

Moreover, in order to realize a radial ball bearing corresponding to Claim 2, this is constructed such that vibration frequencies of the constituent members of the radial ball bearing represented by the above Expressions (1) to (3) do not coincide with each other, that is, $nZf_c \neq mZf_i$, $nZf_i \neq 2kf_b$, $mZf_i \neq 2kf_b$, in the natural frequency domain of a rotation system given by external conditions (conditions other than those for the constituent parts of the radial ball bearing) (second design condition).

The design procedure to realize these first and second design conditions will be described below. Since it is easy to design such that the frequency of the vibration generated due to the undulation of the (2n) waves existing on the rolling surface of each ball does not coincide with other frequencies, the following description is about the design procedure for constructing such that the axial vibration frequency due to undulations of the nZ component existing on each raceway surface (outer ring raceway and inner ring raceway) does not coincide with other frequencies. Moreover, since the radial vibration frequency due to the undulations of the nZ±1 components existing on the raceway surface can be obtained in a similar manner to for the axial vibration frequency due to the undulations of the nZ component existing on this raceway surface, the description thereof is omitted.

It is assumed that in order to satisfy the condition of $nZf_c \neq mZf_i$ so as to realize the radial ball bearing corresponding to Claim 2, these frequencies $nZf_c$ and $mZf_i$ need only be different by ±2% or more. To realize this, it is necessary to satisfy the following Expressions (4) and (5):

$$nf_c/mf_i \geq 1.02 \qquad (4)$$

$$nf_c/mf_i \leq 0.98 \qquad (5)$$

If the aforesaid expressions (1) and (2) are substituted in these expression (4) and (5) and rearranged, the following expression (6) can be obtained. Here, since a radial pre-load is applied on the radial ball bearing, it is assumed that $\alpha \approx 0$.

$$nf_c/mf_i = (d_m - D_a)n/(d_m + D_a)m \quad (6)$$
$$= (D_i/D_e) \cdot (n/m)$$

In this expression (6), $D_i$ denotes a groove diameter of the inner ring (diameter of the bottom portion of the inner ring raceway) and $D_e$ denotes a groove diameter of the outer ring (diameter of the bottom portion of the outer ring raceway). Also, m and n are optional positive integers, as described above.

If a value obtained from the above Expression (6) is deviated from the range of from 0.98 to 1.02 (if the difference between $nf_c$ and $mf_i$ is at least ±2%), banks formed by the grease on the inner ring raceway and the outer ring raceway are not retained. In other words, a condition in that even if a bank of grease is formed, this is crushed by the rolling surface of the ball and does not grow, can be obtained.

The operation to obtain such a condition is performed by shifting the above described two frequencies $nZf_c$ and $mZf_i$, based on a rolling bearing 3 (radial ball bearing) that is used in the middle portion of the propeller shaft 14 or the like and has caused vibration and noise problems. More specifically, this is performed according to the procedure of (1) to (8) described below. Here, the calculation shown in this procedure is automatically executed by a computer in which a predetermined program is installed.

(1) The number Z of rolling bodies of the rolling bearing 3 that has caused vibration and noise problems described above ($nf_c/mf_i \approx 1$), and the groove diameter $D_i$ of the inner ring and the groove diameter $D_e$ of the outer ring are designated as the initial values.

(2) These groove diameter $D_i$ of the inner ring and groove diameter $D_e$ of the outer ring are then changed by ±1~2%. At this time, preferably each groove diameter $D_i$ and $D_e$ is changed such as by ±1%, ±2%, . . . sequentially, in performing the following calculation.

The rotational frequency fr of the inner ring (for example, 32 Hz) is obtained from a representative value of the actual number of revolutions of the inner ring (for example, 1920 $min^{-1}$ (r.p.m.)). Also, the pitch circle diameter $d_m$ of the rolling bodies is obtained from the above described each groove diameter $D_i$ and $D_e$ ($d_m=D_i+D_e)/2=D_i+D_a=D_e-D_a$).

(3) By designating 1 as an initial value, n and m are incremented by +1 sequentially, to obtain the axial vibration frequency $nZf_c$ (Hz) of the outer ring and the axial vibration frequency $mZf_i$ (Hz) of the inner ring, resulting from the waves in undulation existing in the outer ring raceway and the inner ring raceway, from the above described Expressions (1) and (2).

(4) By designating 1 as an initial value, j is incremented by +1 sequentially, to obtain the frequency $jf_r$ proportional to the rotational frequency $f_r$ of the inner ring $f_r$.

(5) As the first designing condition described above, it is judged if the values of $|nZf_c-jf_r|/nZf_c$ and $|mZf_i-jf_r|/mZf_i$ are at least 1~2%.

(6) If these respective values are not at least 1~2% (if the judgment result in the above step (5) is No), the groove diameter $D_i$ of the inner ring and the groove diameter $D_e$ of the outer ring are changed as shown in the above step (2), and the operation up to the above step (5) is repeatedly performed until the respective values become at least 1~2% (until the judgment result in the above step (5) become Yes). When these respective values become at least 1~2%, the procedure proceeds to the next step (7).

(7) The calculation in the above described expression (6) is carried out by using the axial vibration frequencies $nZf_c$ of the outer ring and $mZf_i$ of the inner ring obtained by step (3). This calculation is performed with respect to all values of n and m that can be practically considered.

(8) Based on the calculation result in the above step (7), it is judged if the second design conditions described above, namely $(nZf_c/mZf_i) \geq 1.02$ and $(nZf_c/mZf_i) \leq 0.98$, are satisfied. If both these conditions are not satisfied, the groove diameter $D_i$ of the inner ring and the groove diameter $D_e$ of the outer ring are changed as shown in the above step (2), and the operation up to the above step (7) is repeatedly performed until both conditions are satisfied.

(9) If both conditions are satisfied (the judgment result in the above step (8) becomes Yes), the groove diameter $D_i$ of the inner ring and the groove diameter $D_e$ of the outer ring at that time are designated as the appropriate values.

In the above described calculation, the deviation between frequencies to be compared is made at least ±2%. However, the deviation need only be different so as not to cause resonance, and the size of the deviation required is not limited to at least ±2%. Accordingly, in the above step (2), when the groove diameter $D_i$ of the inner ring diameter and the groove diameter $D_e$ of the outer ring are to be changed, they need only be changed taking into consideration the degree so as not to cause resonances, and they may be changed by a degree outside the range of ±1~2%.

The next Table 2 shows an example of calculation results for the design conditions and the vibration frequencies of the radial ball bearing such as with the above described steps (1) to (9). In this Table 2, there is described as an example a case where the value (order) of n in the vibration frequency $nZf_c$ regarding the undulation of the outer ring raceway is designated as 7, and the value of m in the vibration frequency $mZf_i$ regarding the undulation of the inner ring raceway is designated as 5. In this Table 2, there is shown a calculation result of the Expression (6) described above, in the case where the groove diameter $D_i$ of the inner ring and the groove diameter $D_e$ of the outer ring are changed under this condition.

TABLE 2

| | $D_i/D_e =$ $(d_m - D_a)/$ $(d_m + D_a)$ | n/m | $(D_i/D_e)$ (n/m) |
|---|---|---|---|
| Comparative product | 0.713 | 7/5 = 1.4 | 0.998 ≒ 0% |
| Present invention 1 | 0.73 | 7/5 = 1.4 | 1.022 ≒ 2.2% |
| Present invention 2 | 0.722 | 7/5 = 1.4 | 1.010 ≒ 1.0% |

Among the three calculation examples shown based on the result exemplified in this Table 2, the result of the conventional product is $nZf_c \approx mZf_i$. That is to say, 1026 Hz of the frequency component of the vibration resulting from undulation on the outer ring raceway and 1027 Hz of the frequency component of the vibration resulting from undulation on the inner ring raceway, become almost the same. On the contrary, the result in the present invention is such that these do not coincide with each other. For example, in the case of the present invention product 1, 1109 Hz with respect to 1135 Hz, and in the case of the present invention product 2, 1022 Hz with respect to 1033 Hz. This means that in the case of the conventional product, banks of grease are retained for a long time and lead to vibration and noise of the radial ball bearing, but in the case of the present invention products 1 and 2, banks of grease disappear, and are unlikely to cause the above described vibration and noise.

Figure 2:
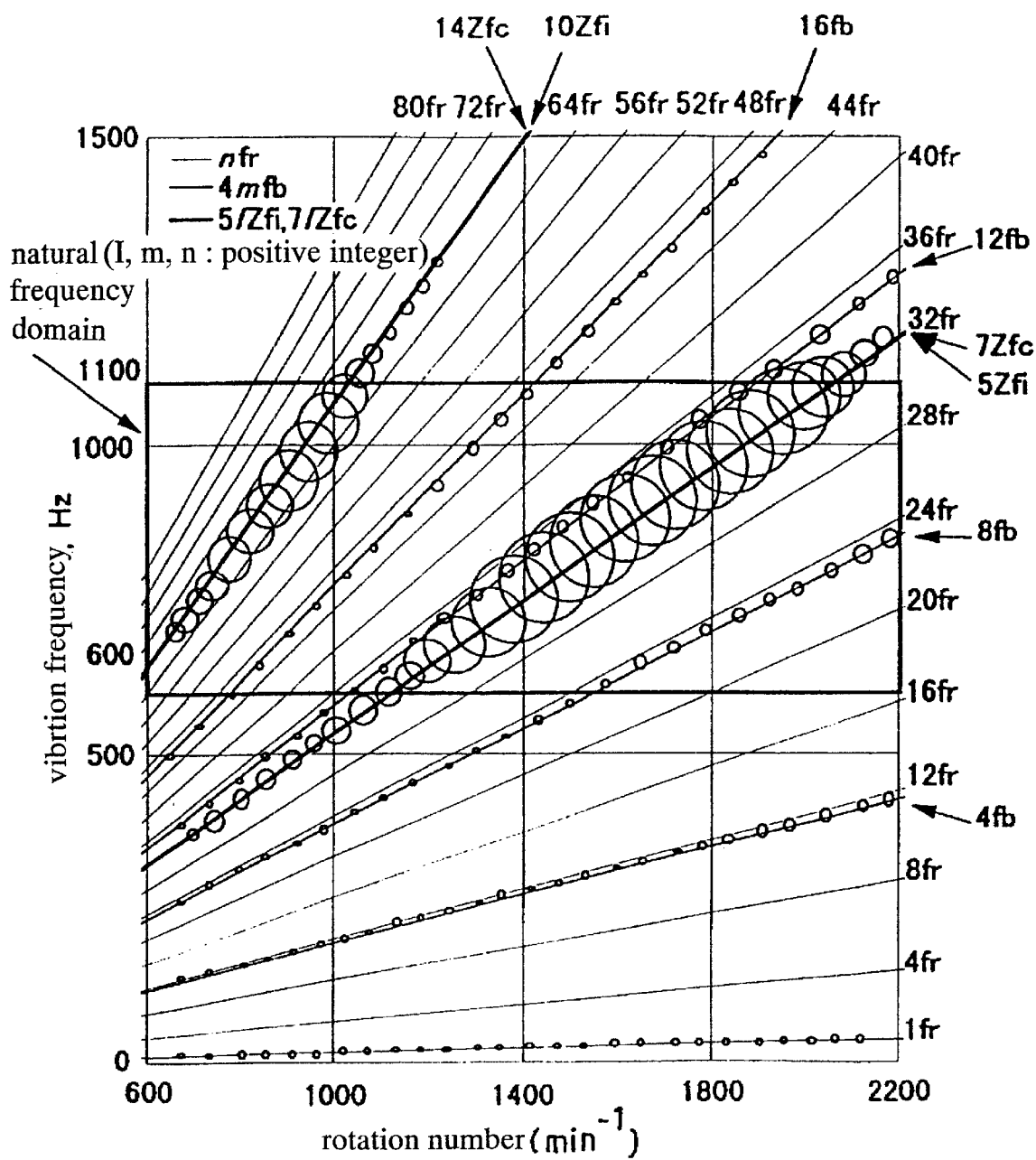
FIG. 2 is a Campbell chart representing vibration generated when a conventional rolling bearing is used.

Moreover, with regard to resonance in the natural frequency domain of the rotation system, with the conventional product, this is conspicuous such as at 32 $f_r$ and 64 $f_r$ as shown in FIG. 2 described below, but on the contrary, with the present invention products 1 and 2, vibration becomes small.

In the above description of the calculation procedure for the designs for realizing the rolling bearing of the present invention, the description is concerned with the case where the initial values of n, m and j are designated as 1, and these values are incremented by +1 from the initial value. However, the vibration level (amplitude) of the frequency components $nZf_c$, $mZf_i$, and $jf_r$ of the above described respective vibrations decreases as the order increases (as the value of n, m and j becomes large). Therefore, from the viewpoint of decreasing the vibration and noise, it is not necessary to limitlessly increase the value of each natural number n, m and j. For example, it is preferable to limit the upper limit of these natural numbers n, m and j to about 100, respectively, in view of reduction of the calculation time, while exerting a practically effective reduction effect on vibration and noise.

EXAMPLES

Results of experiments carried out to confirm the effect of the present invention will now be described. The experiments were carried out by using a deep-groove type ball bearing having an inner diameter of 30 mm, an outer diameter of 55 mm and a width of 13 mm, corresponding to model number 6006, and rotating the rotation shaft with the inner ring externally fitted thereto. The natural frequency of a rotation system, serving as a rotation supporting portion constituted by this rotation shaft, the ball bearing, and a housing supporting this ball bearing was determined by detecting the acceleration generated by impulse excitation using a hammer, with an acceleration sensor 15 as shown in FIG. 1, transmitting this detection value to a computer 17 via an amplifier 16, and processing the detection value by means of FFT (Fast Fourier Transform) with the computer. The natural frequency of the rotation system used in the experiments was approximately 850 Hz, and an area of ±250 Hz centering on the natural frequency, that is, the area of from 600 to 1100 Hz becomes the natural frequency domain where the amplitude increases due to the resonance.

In the experiments, with respect to three kinds of samples, that is, a conventional product outside the technical range of the present invention, a first embodiment belonging to the present invention and satisfying the conditions of Claims 1 and 2, and a second embodiment belonging to the present invention and satisfying only the condition of Claim 2, as shown in the following Table 3, obtained by changing the diameter of the rolling bodies, the number of rolling bodies and the pitch circle diameter of the rolling bodies, without changing the inner and outer diameters and the width of the ball bearing, the relation between the axial vibration frequency with respect to the rotational speed and the level (size) of the generated vibration were obtained, while rotating the respective inner rings. The Table 3 shows a case where the rotational frequency $f_r$ of the inner ring is 32 Hz (=1920 min$^{-1}$ in rotational speed).

TABLE 3

|  | Ball diameter (mm) | Ball number (pieces.) | PCD (mm) | Order | | No. of waves in undulation | Vibration frequency (Hz) |
| --- | --- | --- | --- | --- | --- | --- | --- |
| Conventional product | 7.144 | 11 | 42.7 | Inner ring | 5 | 55 | 1027 |
|  |  |  |  |  | 10 | 110 | 2054 |
|  |  |  |  | Outer ring | 7 | 77 | 1026 |
|  |  |  |  |  | 14 | 154 | 2052 |
| First embodiment | 6.747 | 12 | 43.4 | Inner ring | 3 | 36 | 665.6 |
|  |  |  |  |  | 4 | 48 | 887.4 |
|  |  |  |  |  | 5 | 60 | 1109 |
|  |  |  |  | Outer ring | 4 | 48 | 648.6 |
|  |  |  |  |  | 5 | 60 | 810.8 |
|  |  |  |  |  | 6 | 72 | 972.9 |
|  |  |  |  |  | 7 | 84 | 1135 |
| Second embodiment | 6.747 | 11 | 41.8 | Inner ring | 3 | 33 | 613 |
|  |  |  |  |  | 4 | 44 | 817 |
|  |  |  |  |  | 5 | 55 | 1022 |
|  |  |  |  | Outer ring | 5 | 55 | 737 |
|  |  |  |  |  | 6 | 66 | 885 |
|  |  |  |  |  | 7 | 77 | 1033 |
|  |  |  |  |  | 8 | 88 | 1180 |

Figure 3:
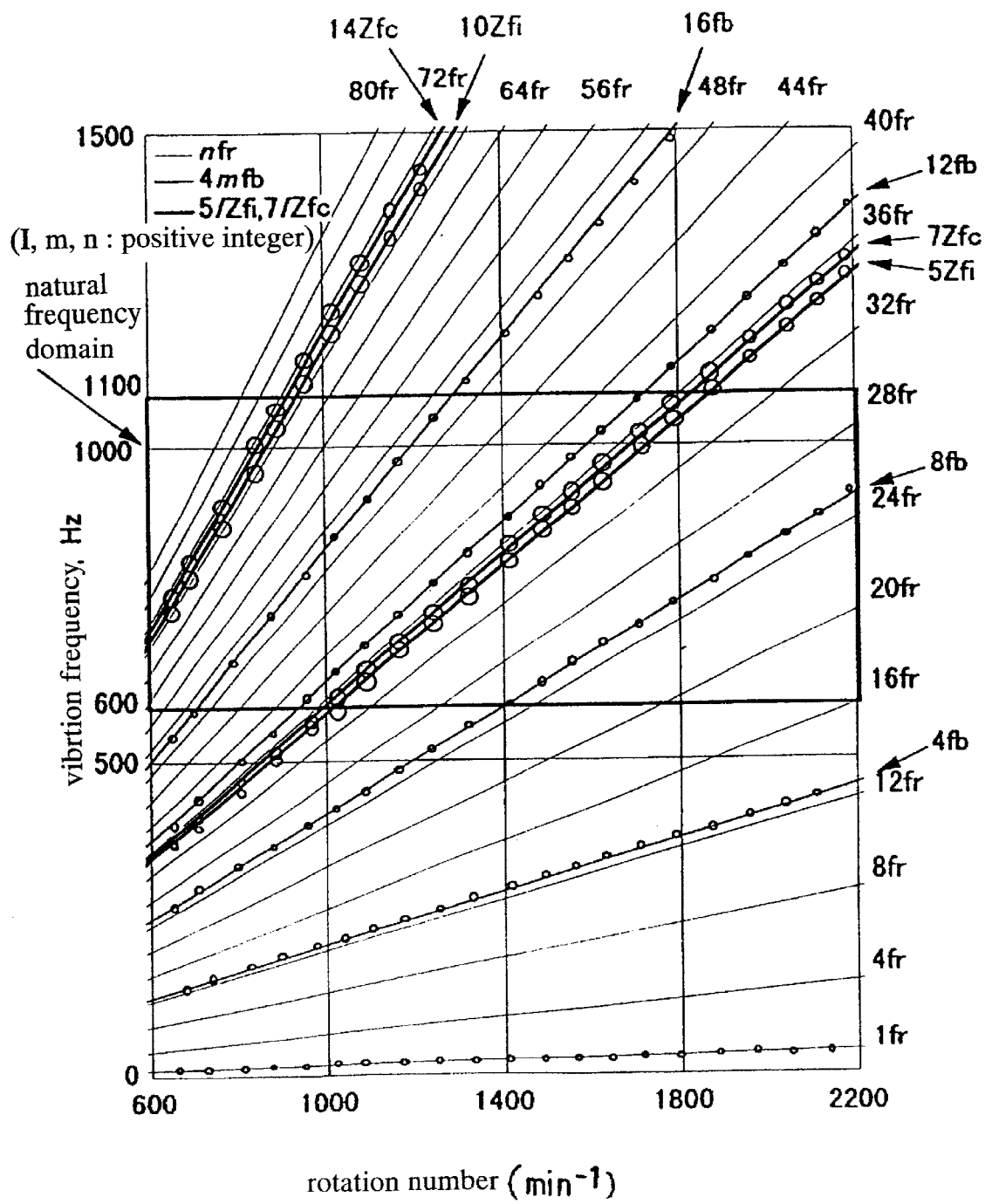
FIG. 3 is a Campbell chart representing vibration generated when a rolling bearing in a first embodiment of the present invention is used.
Figure 4:
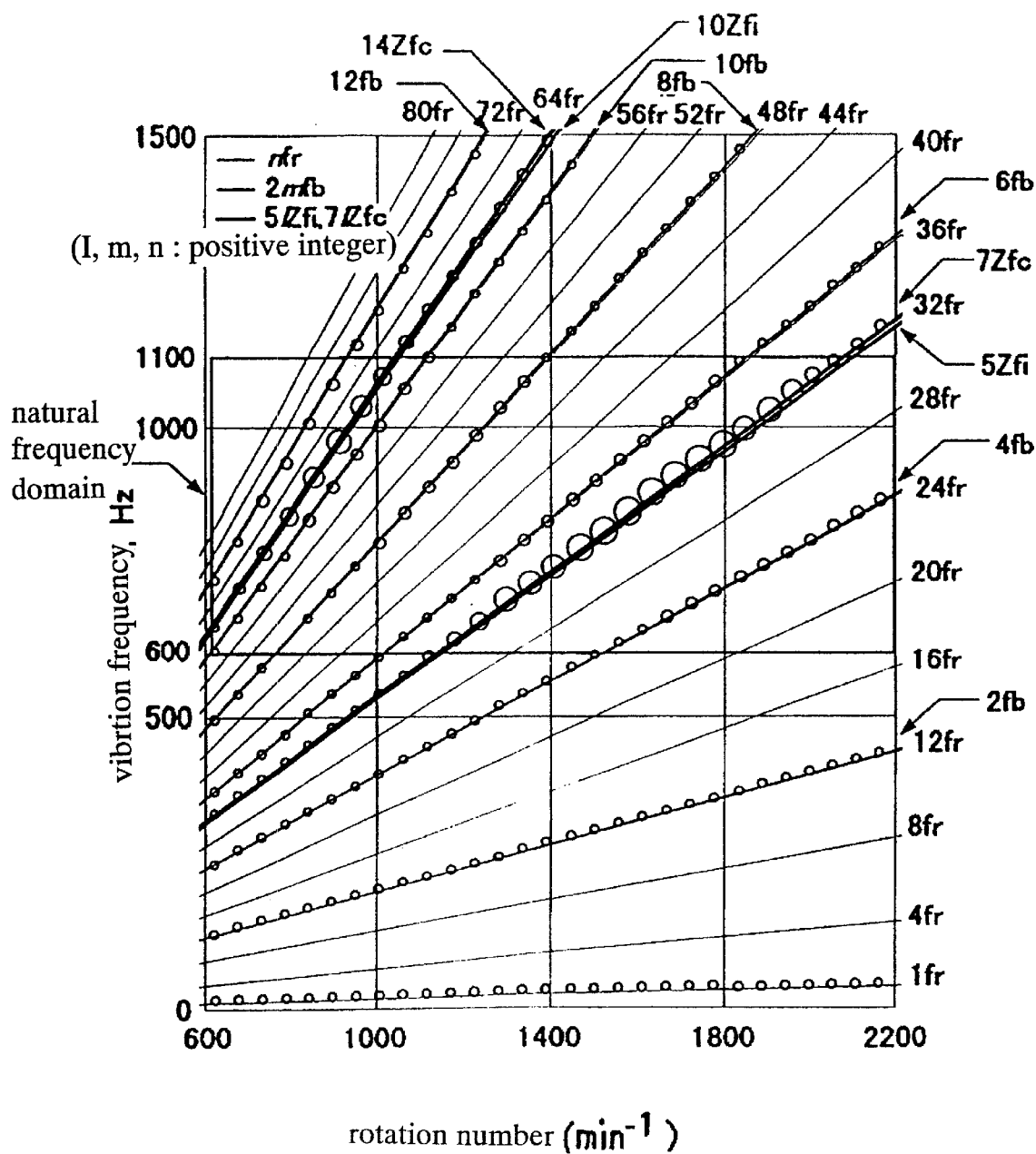
FIG. 4 is a Campbell chart representing vibration generated when a rolling bearing in a second embodiment of the present invention is used.

Results of experiments are shown in FIG. 2 to FIG. 4. Of these figures, FIG. 2 is a Campbell chart showing the experiment result regarding the ball bearing described as a conventional product, FIG. 3 is a Campbell chart showing the experiment result regarding the ball bearing described as the first embodiment, and FIG. 4 is a Campbell chart showing the experiment result regarding the ball bearing described as the second embodiment, respectively, in the above Table 3. In these Campbell charts described as FIGS. 2 to 4, the ordinate denotes the frequency and the rotation order, and the abscissa denotes the number of revolutions, respectively. Also, a circle existing on the same order (on a straight line upward slanting to the right, representing $nf_b$ or the like) denotes a vibration level with respect to the rotation, and the amplitude of the vibration spectrum in that portion is expressed by the size (diameter) of the circle. Moreover, the component parallel to the abscissa at the center of each circle (ordinate component) denotes the natural frequency.

As is obvious (from the fact that the size of the circle in FIGS. 3 and 4 are smaller than that of the circle in FIG. 2), when FIGS. 2 to 4 which are the Campbell charts showing the results of the experiments are compared, in the case of the rolling bearing of the present invention, vibration generated can be kept low compared to with the conventional product.

Respective samples are given consideration below.

At first, in the case of the conventional product described in the upper part of Table 3, since the 32nd order component ($32f_r$=1024 Hz) of the rotational frequency coincides with the frequency of the vibration based on the fifth order of the undulation component of the inner ring ($5Z \cdot f_i$=1027 Hz) and the frequency of the vibration based on the seventh order of the undulation component of the outer ring ($7Z \cdot f_c$=1026 Hz) in the aforesaid natural frequency domain, a large vibration occurs. Moreover, since the 64th order component ($64f_r$=2048 Hz) of the rotational frequency coincides with the frequency of the vibration based on the tenth order of the undulation component of the inner ring ($10Z \cdot f_i$=2054 Hz) and the frequency of the vibration due to the 14th order of the undulation component of the outer ring ($14Z \cdot f_c$=2052 Hz), a large vibration occurs.

Next, in the case of the first embodiment described in the middle part of Table 3, as is obvious from FIG. 3 in which the straight line of $5Z \cdot f_i$ and the straight line of $7Z \cdot f_c$ are deviated from each other, with regard to the frequency of the vibration based on the fifth order of the undulation component of the inner ring ($5Z \cdot f_i$=1109 Hz) and the frequency of the vibration based on the seventh order of the undulation component of the outer ring ($7Z \cdot f_c$=1135 Hz), which are relatively close, these do not coincide with each other. Hence, as is obvious from the small circles present on the straight lines of $5Z \cdot f_i$ and $7Z \cdot f_c$, the generated vibration is small. Moreover, these straight lines of $5Z \cdot f_i$ and $7Z \cdot f_c$ exist between the straight lines of $32f_r$ and $36f_r$, but do not coincide with any of the straight lines of (33~35) $f_r$ existing between these two straight lines. As a result, the generated vibration can be made sufficiently small.

Moreover, in the case of the second embodiment described in the lower part of Table 3, the frequency of the vibration based on the fifth order of the undulation component of the inner ring ($5Z \cdot f_i$=1022 Hz) coincides with the 32nd order frequency (32 $f_r$=1024 Hz) of the rotational speed. That is to say, this does not satisfy the conditions of Claim 1. However, this still satisfies the conditions of Claim 2, such that the vibration frequency components due to undulations existing on the surfaces of the outer ring and inner ring raceways and on the rolling surfaces of the rolling bodies do not coincide with each other in the aforesaid natural frequency domain (600~1100 Hz).

In the case of the second embodiment, though the vibration becomes slightly larger than in the case of the first embodiment, the generated vibration is considerably smaller compared to the case of the conventional product described above. Moreover, according to experiments of the present inventor, even in the case of the second embodiment, if the atmospheric temperature is equal to or higher than −20° C., harmful vibration and noise does not occur.

As is obvious from Table 1 above, for example, with regard to the axial vibration, if the rotational frequency of the rotation member and the frequency due to undulations of each constituent member of the rolling bearing do not coincide at any of the rotational frequencies, then even if this rotational frequency changes (even if the rotational speed of the rotation member changes), this rotational frequency does not coincide with the frequency due to undulations described above. That is to say, $nZf_i$, $nZf_c$, $2nf_b$ representing the axial vibration frequency due to the undulations, and $n_{fr}$ representing the rotational frequency, as described above in Table 1, with respect to each constituent member of the rolling member, are respectively expressed by a straight line passing through an origin point (a point of vibration frequency= 0, and number of revolutions=0) on the Campbell charts in FIG. 2 to FIG. 4. Therefore, if these do not coincide with each other at any rotational frequency, these do not coincide at other rotational frequencies. Also, with regard to radial vibration, even though vibration frequencies generated with regard to the inner ring and the rolling bodies are respectively in two kinds, the straight line representing the vibration frequency passes through the origin point on the Campbell chart. Hence, also in the case of the radial vibration, this is the same as in the case of the axial vibration in that if these do not coincide with each other at any rotational frequency, these do not coincide at other rotational frequencies.

Since there is little possibility of a situation where only the conditions of Claim 1 are satisfied and the conditions of Claim 2 are not satisfied, any experiment for such a case was not performed. However, as is obvious from the above description, it is believed that even a structure satisfying only the conditions of Claim 1 can practically reduce vibration sufficiently. Needless to say, the most preferable structure is the one described in Claim 3, wherein both conditions of Claims 1 and 2 are satisfied as with the first embodiment. Moreover, the above description has been made for the case of a deep groove type ball bearing, being a radial ball bearing, and for the case of axial vibration. However, the present invention can be similarly applied to radial vibration, by using the vibration frequency generated in the radial direction, instead of the vibration frequency generated in the axial direction. Also, the same idea can be applied not only to a radial ball bearing but also to a thrust ball bearing or a radial or thrust roller bearing.

INDUSTRIAL APPLICABILITY

The rolling bearing of the present invention is constructed and operates as described above, and hence the occurrence of vibration and noise at the time of low temperatures can be effectively prevented, without using grease having a low particularly viscosity. As a result, a rolling bearing having excellent durability can be realized without causing an uncomfortable sensation.

What is claimed is:

1. A rolling bearing comprising a first race having a first raceway, a second race provided around the first race and having a second raceway, Z rolling bodies having a rolling surface and rollably disposed between the first raceway and the second raceway, and a retainer for holding the rolling bodies, such that under grease lubrication, the first race rotates at the frequency of $f_r$ (Hz) while the rolling bodies held in the retainer rotate at the frequency of $f_b$ (Hz) and revolve at the frequency of $f_c$ (Hz), wherein, when assumed that n, m, k and j are each a positive integer up to 100, respectively, that $D_a$ is the diameter of the rolling bodies, that dm is the pitch circle diameter of the rolling bodies, that $\alpha$ is the contact angle between the rolling bodies and the first and second raceways and that vibration is generated at frequencies of $mZf_i$, $mZf_i \pm f_r$, $nZf_c$, $2kf_b$ and $2kf_b \pm f_c$ due to the circumferential undulations of (mZ) waves and (mZ+1) waves existing on the surface of the first raceway, to the circumferential undulations of (nZ) waves and (nZ±1) waves existing on the surface of the second raceway and to the undulation of (2k) waves existing on the rolling surface of the respective rolling bodies, the formulas of $(mZf_j) \neq jf_r$, $(mZf_i \pm f_r) \neq jf_r$, $(nZf_c) \neq jf_r$, $(2kf_b) \neq jf_r$ and $(2kf_b \pm f_c) \neq jf_r$ are satisfied for all of n, m, k and j with respect to the frequencies, where $f_i = f_r - f_c$ (Hz), $nZf_c = (1/2)nf_r\{1-(D_a/d_m)$ cos α}Z, mZf$_i$=(1/2)mf$_r${1+(D$_a$/d$_m$)cos α}Z, and 2kf$_b$=kf$_r${1−(D$_a$/d$_m$)$^2$cos$^2$ α}d$_m$/D$_a$.

2. A rolling bearing comprising a first race having a first raceway, a second race provided around the first race and having a second raceway, Z rolling bodies having a rolling surface and rollably disposed between the first raceway and the second raceway, and a retainer for holding the rolling bodies, such that under grease lubrication, the first race rotates at the frequency of f$_r$ (Hz) while the rolling bodies held in the retainer rotate at the frequency of f$_b$ (Hz) and revolve at the frequency of f$_c$ (Hz), wherein, when assumed that n, m, k and j are each a positive integer up to 100, respectively, that D$_a$ is the diameter of the rolling bodies, that d$_m$ is the pitch circle diameter of the rolling bodies, that α is the contact angle between the rolling bodies and the first and second raceways and that vibration is generated at frequencies of mZf$_i$, mZf$_i$±f$_r$, nZf$_c$, 2kf$_b$ and 2kf$_b$±f$_c$ due to the circumferential undulations of (mZ) waves and (mZ±1) waves existing on the surface of the first raceway, to the circumferential undulations of (nZ) waves and (nZ±1) waves existing on the surface of the second raceway and to the undulation of (2k) waves existing on the rolling surface of the respective rolling bodies, the formulas of (mZf$_i$)≠(nZf$_c$), (mZf$_i$±f$_r$)≠(nZf$_c$), (nZf$_c$)≠(2kf$_b$), (nZf$_c$)≠(2kf$_b$±f$_c$), (2kf$_b$)≠(mZf$_i$) and (2kf$_b$±f$_c$)≠(mZf$_i$±f$_r$) are satisfied in the natural frequency domain of a rotation system which is a rotation supporting portion having the rolling bearing incorporated therein where f$_i$=f$_r$−f$_c$ (Hz), nZf$_c$=(1/2)nf$_r${1−(D$_a$/d$_m$)cos α}Z, mZf$_i$=(1/2)mf$_r${1+(D$_a$/d$_m$)cos α}Z, and 2kf$_b$=kf$_r${1−(D$_a$/d$_m$)$^2$cos$^2$a}d$_m$/D$_a$.

3. The rolling bearing of claim 2, wherein the formulas of nf$_c$/mf$_i$≧1.02, and nf$_c$/mf$_i$≦0.98 are satisfied, where nf$_c$/mf$_i$=(d$_m$−D$_a$)n/(d$_m$+D$_a$)m.

4. The rolling bearing of claim 2, wherein the natural frequency domain of the rotation system is in the range of F$_n$±250 (Hz) where F$_n$ is the natural frequency which is determined by detecting an acceleration generated by impulse excitation of the rotation system by way of a hammer and processing the acceleration with FFT.

5. A rolling bearing comprising a first race having a first raceway, a second race provided around the first race and having a second raceway, Z rolling bodies having a rolling surface and rollably disposed between the first raceway and the second raceway, and a retainer for holding the rolling bodies, such that under grease lubrication, the first race rotates at the frequency of f$_r$ (Hz) while the rolling bodies held in the retainer rotate at the frequency of f$_b$ (Hz) and revolve at the frequency of f$_c$ (Hz), wherein, when assumed that n, m, k and j are each a positive integer up to 100, respectively, that D$_a$ is the diameter of the rolling bodies, that d$_m$ is the pitch circle diameter of the rolling bodies, that α is the contact angle between the rolling bodies and the first and second raceways and that vibration is generated at frequencies of mZf$_i$, mZf$_i$±f$_r$, nZf$_c$, 2kf$_b$ and 2kf$_b$±f$_c$ due to the circumferential undulations of (mZ) waves and (mZ±1) waves existing on the surface of the first raceway, to the circumferetial undulations of (nZ) waves and (nZ±1) waves existing on the surface of the second raceway and to the undulation of (2k) waves existing on the rolling surface of the respective rolling bodies, the formulas of (mZf$_i$)≠jf$_r$, (mZf$_i$±f$_r$)≠jf$_r$, (nZf$_c$)≠jf$_r$, (2kf$_b$)≠jf$_r$ and (2kf$_b$±f$_c$)≠jf$_r$ are satisfied for all of n, m, k and j with respect to the frequencies, and the formulas of (mZf$_i$)≠(nZf$_c$), (mZf$_i$±f$_r$)≠(nZf$_c$), (nZf$_c$)≠(2kf$_b$), (nZf$_c$)≠(2kf$_b$±f$_c$), (2kf$_b$)≠(mZf$_i$) and (2kf$_b$±f$_c$)≠(mZf$_i$±f$_r$) are satisfied in the natural frequency domain of a rotation system which is a rotation supporting portion having the rolling bearing incorporated therein where f$_i$=f$_r$−f$_c$ (Hz), nZf$_c$=(1/2)nf$_r${1−(D$_a$/d$_m$)cos α}Z, mZf$_i$=(1/2)mf$_r${1−(D$_a$/d$_m$)cos α}Z, and 2kf$_b$=kf$_r${1−(D$_a$/d$_m$)$^2$cos$^2$ α}d$_m$/D$_n$.

6. The rolling bearing of claim 5, wherein the formulas of nf$_c$/mf$_i$≦1.02, and nf$_c$/mf$_i$≦0.98 are satisfied, where nf$_c$/mf$_i$=(d$_m$−D$_a$)n/(d$_m$+D$_a$)m.

7. A method for design of the rolling bearing of claim 6 comprising the steps of:

(a) increasing the values n and m from the initial value of 1 to 100 by plus ones in the formulas of nZf$_c$=(1/2)nf$_r${1−(D$_a$/d$_m$)cos α}Z and mZf$_i$=(1/2)mf$_r${1+(D$_a$/d$_m$)cos α}Z, so as to obtain the axial vibration frequency nZf$_c$ (Hz) of the outer race and the axial vibration frequency Zf$_i$ (Hz) of the inner race due to the number of waves of undulation on the outer and inner raceways.

(b) increasing the value of j from the initial value of 1 to 100 by plus ones to obtain the frequency jf$_r$ proportional to the speed f$_r$ of the inner race, (c) obtaining|nZf$_c$−jf$_r$|/nZf$_c$ and|mZf$_i$−jf$_r$|/mZf$_i$, (d) if the value obtained at the step (c) is less than 0.02, changing the groove diameters of the inner and outer races to obtain the pitch circle diameter of the rolling bodies, and repeating the steps (a) to (d) until the value obtained at step (c) is at least 0.02, (e) if the value obtained at the step (c) or (d) is at least 0.02, obtaining (nZf$_c$/mZf$_i$) for all of nZf$_c$ and mZf$_i$ obtained in the step (a) in the range from 1 to 100 of n and m, (f) if all the values obtained at the step (e) do not satisfy (nZf$_c$/mZf$_i$)≧1.02 and (nZf$_c$/mZf$_i$)≦0.98, changing the groove diameters of the inner and outer races to obtain the pitch circle diameter of the rolling bodies, and repeating the steps (a) to (e) until all the values obtained at the step (e) satisfy (nZf$_c$/mZf$_i$)≧1.02 and (nZf$_c$/mZf$_i$)≦0.98, and (g) if all the values obtained at the step (e) or (f) satisfy (nZf$_c$/mZf$_i$)≧1.02 and (nFf$_c$/mZf$_i$)≦0.98, the values are deemed to be proper, and the calculation is finished.

8. The method of claim 7, where the diameter of the rolling bodies, the number of the rolling bodies and the pitch circle diameter of the rolling bodies are changed without changing the inner and outer diameters and the width of the ball bearing.

9. The rolling bearing of claim 5, wherein the natural frequency domain of the rotation system is in the range of F$_n$±250 (Hz) where F$_n$ is the natural frequency which is determined by detecting an acceleration generated by impulse excitation of the rotation system by way of a hammer and processing the acceleration with FFT.

* * * * *